G. W. FOWLER & W. P. SIEBENMORGEN.
SPEED CHANGING DEVICE FOR MOTORS.
APPLICATION FILED MAR. 16, 1908.
952,033.
Patented Mar. 15, 1910.
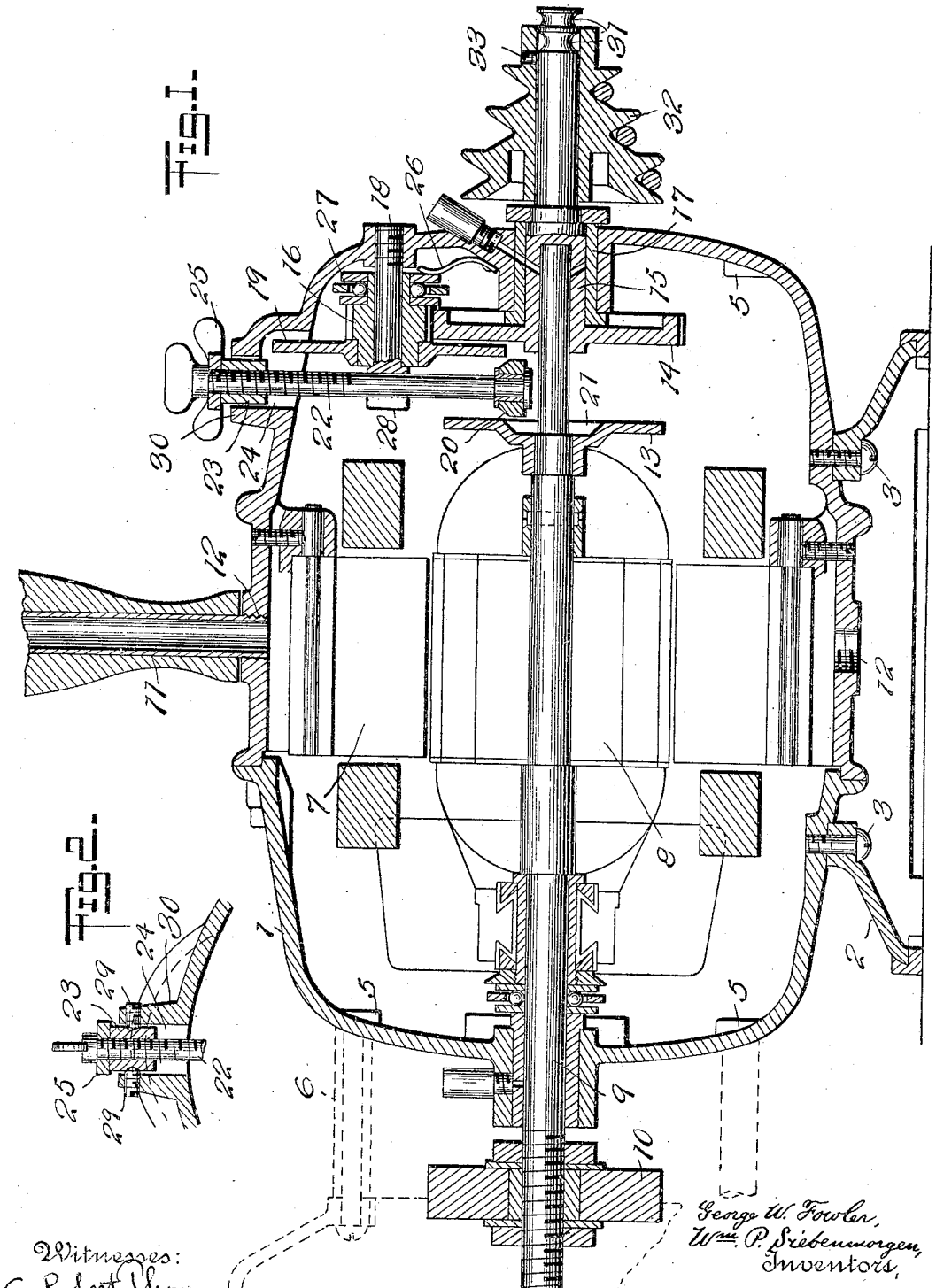

UNITED STATES PATENT OFFICE.

GEORGE W. FOWLER AND WILLIAM P. SIEBENMORGEN, OF WESTFIELD, NEW JERSEY.

SPEED-CHANGING DEVICE FOR MOTORS.

952,033.

Specification of Letters Patent.   Patented Mar. 15, 1910.

Application filed March 16, 1908.  Serial No. 421,447.

*To all whom it may concern:*

Be it known that we, GEORGE W. FOWLER and WILLIAM P. SIEBENMORGEN, citizens of the United States, and residents of the town of Westfield, Union county, and State of New Jersey, have invented certain new and useful Improvements in Speed-Changing Devices for Motors, of which the following is a specification.

The object of this invention is to provide an improved form of variable speed gearing, designed particularly for portable motors.

The invention comprises the various new features of construction and combinations of parts described and illustrated, and more particularly pointed out in the claims.

In the drawings, Figure 1 is a vertical, longitudinal section through a motor embodying the improved gearing, and Fig. 2 is a sectional detail.

Referring to these drawings, 1 indicates a suitable casing, preferably horizontally elongated, for the motor. This casing is shown as supported horizontally by a removable base 2, secured in place by screws 3. The ends of the casing may be tapped, as at 5, to permit the base to be secured thereto, to hold the casing in an upright position; the dotted lines at 6 indicating how a spacing member may be inserted between the base and casing.

7 is the field, and 8 the armature within the casing.

A handle 11 or a hanger may be screwed in tapped openings 12.

9 is the armature shaft, which is shown as journaled in and projecting through one end of the casing. This end of the shaft may be utilized for driving various tools and mechanisms at high speed, in the drawing, a grinding or polishing wheel 10 being shown mounted removably thereon. Toward the other end of the shaft 9 is secured a friction disk 13. Opposed to this disk is a pinion 14, the hub of which, 15, is journaled in a bushing 17 in the adjacent end of the casing, said hub, itself, serving as a bearing for the adjacent end of the shaft 9. Pinion 14 meshes with a pinion 16, which is mounted on a stub shaft 18, conveniently screwed into the adjacent end of the casing. Fixed on the hub of pinion 16, or otherwise made rigid therewith is a second friction disk 19. Between the opposed faces of the two friction disks is a friction roller 20. In the position shown in the drawing, this roller is below the periphery of the disk 19 and opposite a central dished region 21 in the face of the disk 13; so that motion is not communicated from one disk to the other. The roller 20, however, may be caused to connect the two disks, by means of its shaft 22, which is shown as extending vertically upward and threaded through a sleeve 23, mounted in an opening 24 in the top of the casing. By screwing the shaft upward the roller 20 is caused to engage with both friction surfaces; and the speed may be varied by adjusting the roller up and down. A lock nut 25 may be provided to secure the shaft in any of its adjusted positions.

In order to provide for holding the friction surfaces in yielding contact, I have shown a spring 26, secured to the casing, and bearing against a thrust bearing 27, so as to tend to hold the pinion 16 and friction disk 19 against the head 28 of the stub shaft 18. This head 28 has a vertical slot extending inward from its end face, for the loose reception of the shaft 22; the object of this construction being to prevent the roller 20 from swinging across the faces of the friction disks 13 and 19. Slight movement of the roller 20 in a plane normal to the friction surfaces of the disks is, however, permitted by pivots 29, which are shown as being screwed through a flange 30 of the casing, in general parallelism to the friction surfaces of the disks 13 and 19, and bearing against notches in the sleeve 23.

The hub 15 extends through the adjacent end of the casing, and constitutes the variable speed shaft. Power may be taken from it by means of the grooves 31, on which may also be mounted various tools or mechanism; or by means of a cone pulley 32 secured in place by a set screw 33.

In addition to the construction of the variable speed gearing, applicant desires to point out as novel with him, the design of a motor, one projection of whose armature shaft serves as a high speed shaft rotating at constant speed, while the other projection of the armature shaft is connected with a low speed shaft by means of a variable speed reducing gearing. This style of motor is applicable for a very wide range of usefulness, some of the applications being: portable or stationary grinder, buffer and polisher, portable hand or breast drill, stationary drill, dental lathe work, jewelers' work, automatic pianos, banjos, phonographs, picture machines, advertising novelties, sign flashers, sewing machine drive, air pumps, coffee mills, ice-cream freezers, dough mixers, bread kneaders, washing machines, hair clippers, fans, blowers, exhausters, ceiling fans, bottle cleaners, paint scrubbers, cloth cutter, etc.

A further feature of novelty, to which particular attention is drawn, is the arrangement of the high and low speed shafts in alinement, the low speed shaft, or an extension thereof, serving as a bearing for the high speed shaft.

What we claim as new is:

1. A gearing, comprising a driving shaft, a friction disk thereon, an idler shaft to one side of the driving shaft, a friction disk slidably mounted on said idler shaft, a gear also on said idler shaft and secured to the second friction disk, a driven shaft positioned in alinement with said driving shaft, a gear thereon engaging with the first named gear, and a friction roller adjustable between the opposed portions of the faces of said friction disks.

2. A speed changing device comprising in its construction a driving shaft, a friction disk carried by said driving shaft, a driven shaft positioned in alinement with said driving shaft, a stationary idler shaft, a rotatable friction disk carried by said idler shaft, a friction roller operatively engaging said friction disks, means for holding the friction surfaces in yielding contact, and means for transmitting the movement of said last named friction disk to said driven shaft.

3. A gearing, comprising a driving shaft, a driven shaft serving as a bearing for the driving shaft, a friction disk on the driving shaft, an idler shaft to one side of the two shafts, a second friction disk on said idler shaft, a gear also on said idler shaft and secured to the second friction disk, a gear on the driven shaft engaging the first-named gear, and a friction roller adjustable between the two friction disks.

4. A friction gearing, comprising opposed friction disks, a shaft between said disks, a friction roller carried by said shaft, a pivotal support for said shaft constructed to permit oscillation of the latter in a plane normal to the faces of the disks, and a slotted guide member for preventing oscillation of said shaft parallel to the disk faces.

5. In a friction gearing, the combination of a casing or support, opposed friction disks, a depending shaft between said disks, a friction roller carried by said shaft, a sleeve into which the upper portion of the shaft is threaded to permit adjustment of the roller radially of the disks, and means pivoting said sleeve to the casing on an axis generally parallel to the opposed faces of the friction disks.

6. A casing, a motor mounted therein and having one end of its armature shaft projecting outside of said casing and arranged for direct driving, a projecting shaft forming an extension of the opposite end of said armature shaft, and a variable speed reducing gearing connecting said shafts.

7. A casing, a motor mounted therein and having one end of its armature shaft projecting outside of said casing and arranged for direct driving, a projecting shaft forming an extension of the opposite end of said armature shaft, a friction disk mounted on said armature shaft, an intermediate shaft mounted within said casing, a second friction disk carried by said intermediate shaft, a friction roller adjustably mounted with relation to said friction disks, a pinion operated by said second friction disk, and a gear meshing with said pinion and carried by said last named projecting shaft.

Signed at New York city in the county of New York and State of New York, this 4th day of March 1908.

GEORGE W. FOWLER.
WM. P. SIEBENMORGEN.

Witnesses:
PAMELIA W. von PREIF,
J. O. FREDERICKS.